(12) United States Patent
Coberly et al.

(10) Patent No.: US 10,493,345 B2
(45) Date of Patent: Dec. 3, 2019

(54) BIKE TRAINER GUIDE APPARATUS

(71) Applicant: GoRolz, LLC, Edison, NJ (US)

(72) Inventors: Arthur D. Coberly, Walden, NY (US); Ramon Moya, Campbell Hall, NY (US)

(*) Notice: Subject to any disclaimer, the term of this patent is extended or adjusted under 35 U.S.C. 154(b) by 0 days.

(21) Appl. No.: 16/055,435

(22) Filed: Aug. 6, 2018

(65) Prior Publication Data

US 2018/0339211 A1   Nov. 29, 2018

Related U.S. Application Data

(63) Continuation-in-part of application No. PCT/US2017/016683, filed on Feb. 6, 2017.

(60) Provisional application No. 62/291,711, filed on Feb. 5, 2016.

(51) Int. Cl.
*A63B 69/16* (2006.01)
*A63B 22/06* (2006.01)
*F16M 13/04* (2006.01)

(52) U.S. Cl.
CPC ...... *A63B 69/16* (2013.01); *A63B 2022/0641* (2013.01); *A63B 2069/161* (2013.01); *A63B 2069/165* (2013.01); *A63B 2069/168* (2013.01); *F16M 13/04* (2013.01)

(58) Field of Classification Search
CPC ....... A63B 69/16–2069/168; A63B 2022/0641
See application file for complete search history.

(56) References Cited

U.S. PATENT DOCUMENTS

| 4,817,939 A * | 4/1989 | Augspurger | A63B 22/16 482/2 |
| 4,941,651 A | 7/1990 | Phillips | |
| 5,020,621 A | 6/1991 | Martin | |
| 2003/0027692 A1 | 2/2003 | Phillips | |
| 2004/0053751 A1* | 3/2004 | Pizolato | A63B 22/16 482/61 |
| 2005/0209064 A1 | 9/2005 | Peterson et al. | |
| 2007/0060453 A1* | 3/2007 | Papadopoulos | A63B 69/16 482/61 |

(Continued)

FOREIGN PATENT DOCUMENTS

DE          2208948 A1     9/1973

OTHER PUBLICATIONS

International Patent Application No. PCT/US2017/016683, International Search Report and Written Opinion, dated May 5, 2017.

*Primary Examiner* — Jennifer M Deichl
(74) *Attorney, Agent, or Firm* — Cooper Legal Group, LLC

(57) ABSTRACT

Provided is a bike training device having a frame that rotatably supports a pair of rear rollers spaced a distance apart from each other along a longitudinal axis of the frame to rotatably support a rear wheel of the bicycle that rolls on both of the rear rollers. A front roller is spaced apart from the rear rollers along the frame a suitable distance to rotatably support a front wheel of the bicycle. A guide apparatus comprising a connection mechanism that is pivotally supported at an elevation vertically above the frame cooperates with a rear hub of the bicycle and allows for lateral movement of the rear wheel in axial directions along the rear rollers during rotation of the rear wheel of the bicycle, but limits an extent of the lateral movement to maintain the rear wheel between terminal lateral ends of the rear rollers.

10 Claims, 4 Drawing Sheets

(56) References Cited

U.S. PATENT DOCUMENTS

2009/0302078 A1 12/2009 Wang
2015/0314184 A1 11/2015 Moya Saez et al.

* cited by examiner

BIKE TRAINER GUIDE APPARATUS

BACKGROUND OF THE INVENTION

1. Field of the Invention

This application relates generally to an apparatus for stabilizing a bike and, more specifically, to an apparatus to a bike trainer to be coupled to a bike, the bike trainer including fore and aft rollers on which a front wheel and a rear wheel, respectively, of the bike roll to allow limited lateral movement of the bike during use.

2. Description of Related Art

Bike trainers commonly include a frame supporting at least one rear roller on which the rear wheel of a bike can roll while the bike itself remains stationary. The front forks of the bike can be secured to the frame to prevent the bike from moving, in both the fore and aft directions as well as laterally, while being ridden on the trainer. However, such trainers do not provide riders with a realistic feel since the bike is firmly fixed at a stationary location by the connection between the frame and the bike.

Attempts to provide riders with an experience that more accurately represents actually riding a bike have included the provision of a forward roller on the frame, allowing the forward roller to rotate with the rear roller. With both the front and rear wheels of the bike spinning, the bike could move laterally, along the axial direction of the roller, requiring the rider to balance the bike instead of simply sitting on a stationary bike that is secured in place. Although trainers with spinning front and rear wheels enhance the exercise experience, inexperienced riders can be reluctant to use them out of fear they will inadvertently allow the bike to travel laterally off of the front and/or rear roller(s). And trainers with built-in lateral guides may quickly be outgrown by riders, requiring them to then purchase a more-advanced trainer at a substantial cost.

BRIEF SUMMARY OF THE INVENTION

According to one aspect, the subject application involves a bike training device to be coupled to a bicycle. The bike training device includes a frame rotatably supporting a pair of rear rollers spaced a distance apart from each other along a longitudinal axis of the frame to rotatably support a rear wheel of the bicycle that rolls on both of the rear rollers. A front roller is spaced apart from the rear rollers along the frame a suitable distance to rotatably support a front wheel of the bicycle. A drivetrain couples at least one of the rear rollers to the front roller and transfers a rotational force imparted on the at least one of the rear rollers by the bicycle to the front roller to cause rotation of the front roller. A guide apparatus comprising a connection mechanism that is pivotally supported at an elevation vertically above the frame to cooperate with a rear hub of the bicycle and couple the bicycle to the bike trainer. The present device allows for lateral movement of the rear wheel in axial directions along the rear rollers during rotation of the rear wheel of the bicycle, but limits an extent of the lateral movement to maintain the rear wheel between terminal lateral ends of the rear rollers.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
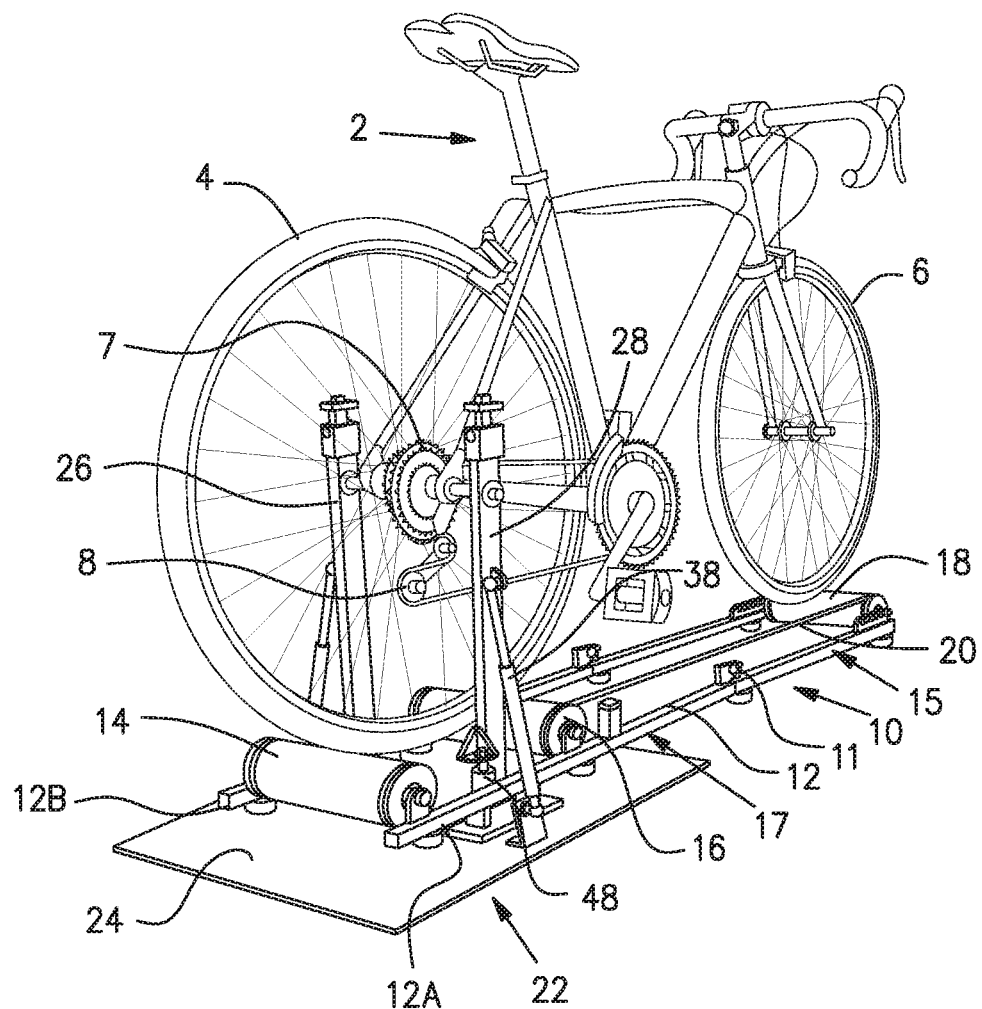
FIG. 1 shows an illustrative embodiment of a guide apparatus coupled to a bike positioned on a trainer.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

There is a need in the art for an accessory guide apparatus that is compatible with a bike trainer, and a bike trainer including such an accessory to provide limited stability to a bike while it is being ridden on the bike trainer. Such a guide apparatus allows the bike to travel in the axial direction along rollers while being ridden, yet limit the extent of such travel to prevent at least the rear wheel of the bike from rolling laterally (along the axial direction of the roller) off the side of the rear roller. And to ease the concerns of inexperienced riders and let them become familiar with a bike trainer that allows lateral movement of the bike along a pair of rollers, the present guide apparatus can optionally be positioned independently of a bike trainer designed and configured without a lateral guide limiting the lateral travel of the bike along the rollers, to be used as a separate accessory for the bike trainer. The present guide apparatus can also optionally be removable without damaging the guide apparatus or bike trainer, once installed, to be subsequently coupled to, and re-installed on the same bike trainer or a different bike trainer. According to alternate embodiments, the guide apparatus can be a permanent fixture, installed as part of the bike trainer itself.

With reference to FIG. 1, a road-ready bike 2 (i.e., with wheels, steering, pedal drivetrain, etc. to be ridden on public roads) is converted into a stationary bike by being coupled to a trainer 10. As shown, the trainer 10 includes a frame 12 that supports a pair of rear rollers 14, 16, which can rotate independently of each other when not being driven by a the rear wheel 4 of the bike 2. The rear rollers 14, 16 are spaced a distance apart from each other along a longitudinal axis of the frame 12 to support a rear wheel 4 of the bike 2 rolling on both of the rear rollers 14, 16. A front roller 18 is positioned at a forward location along the frame 12, and spaced apart from the rear rollers 14, 16 a suitable distance to support the front wheel 6 of the bike 2 while the rear wheel 4 of the bike 2 is supported by the rear rollers 14, 16. The frame 12 can optionally be articulated, and include at least one, and optionally a plurality of pivot points 11 about which a forward region 15 of the frame 12 can be pivoted and arranged adjacent to a rearward region 17 of the frame.

A drivetrain 20 in the form of a cord, cable, chain, belt, or other continuous loop of material extending about the front roller 18 and at least one of the rear rollers 14, 16 couples the rear roller(s) 14, 16 to the front roller 18, to transfer a rotational force imparted on the rear roller 16 by the rear wheel 4 of the bike 2 to the front roller 18, thereby causing rotation of the front roller 18 and, accordingly, the front wheel 6 of the bike 2.

The trainer 10 is shown in FIG. 1 being used with a guide apparatus 22 that limits the lateral movement of the rear wheel 4 on the rear rollers 14, 16, and interferes with the ability of the rear wheel 4 to travel off of the lateral sides (in the axial direction) of the rear rollers 14, 16. The guide apparatus 22 in FIG. 1 can be separate from the trainer 10, without being fixedly attached to the trainer 10 by a direct mechanical connection extending directly between a portion (e.g., frame 12) of the trainer 10 and a portion of the guide apparatus 22. Instead, the guide apparatus 22 can optionally include a platform 24 forming a base on which at least a portion of the trainer 10 can be placed. For such embodiments, the guide apparatus 22 is coupled to the trainer 10 only through the common cooperation of both structures with the bike 2. In other words, the guide apparatus 22 can be positioned independently of the trainer 10, to be used as an after-market accessory with the trainer 10. The guide apparatus 22 can optionally be configured to be compatible with a specific make and/or model of the trainer 10, or can be configured with dimensions suitable to render the guide apparatus 22 compatible for use with a plurality of different trainers 10.

According to alternate embodiments, the guide apparatus 22 can optionally be permanently coupled to the trainer 12 by a direct mechanical or welded connection between the two structures (e.g., between a platform 24 of the guide apparatus 22 and the frame 12 of the trainer 10), rendering the guide apparatus 22 unable to be used with another trainer. Yet other embodiments involve securely but removably affixing the guide apparatus 22 to the trainer 10 by a direct mechanical connection between the two structures (e.g., threaded fasteners between a platform 24 of the guide apparatus 22 and the frame 12 of the trainer 10), optionally rendering the guide apparatus 22 usable with another compatible trainer of the same, or possibly different configuration.

Figure 2:
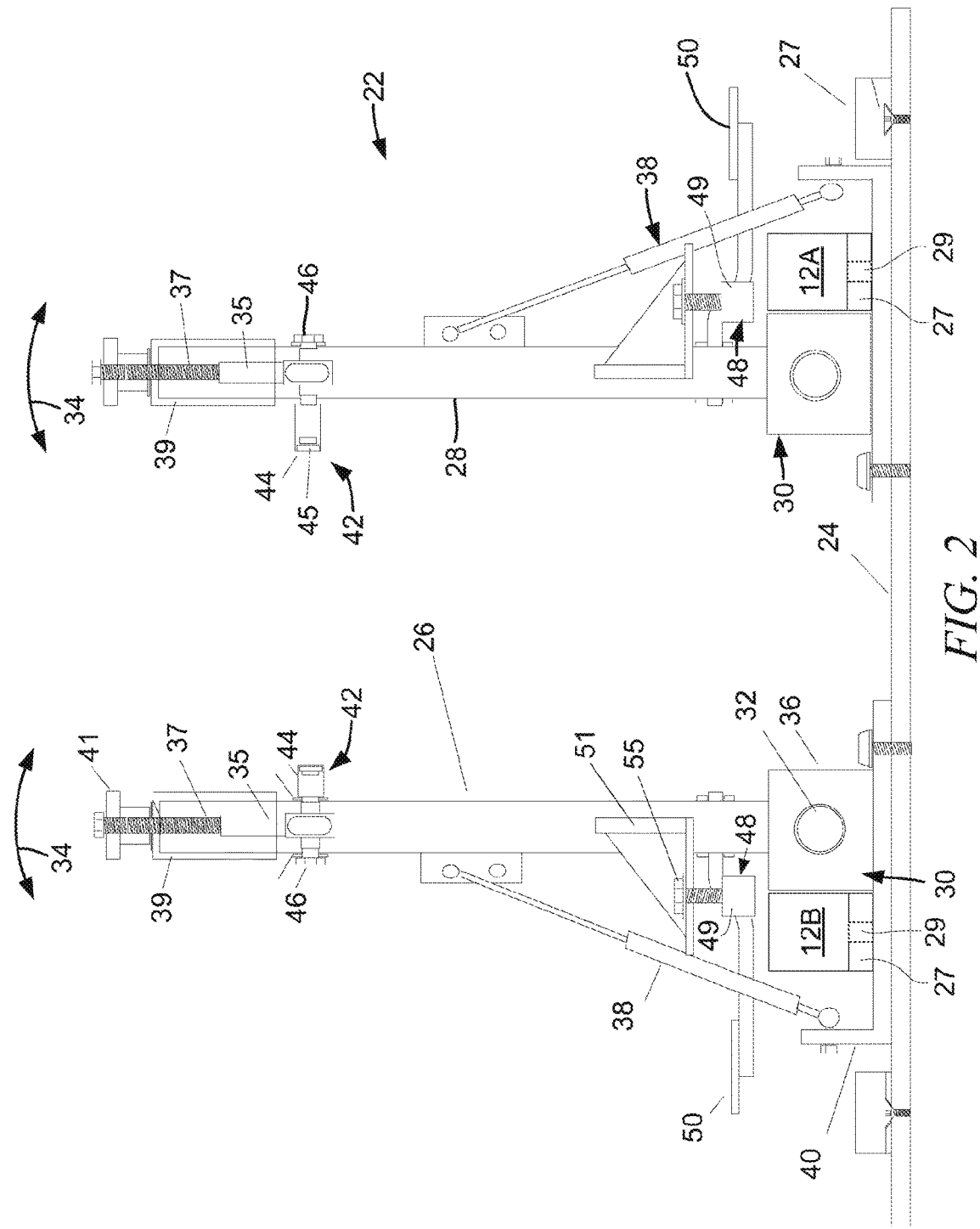
FIG. 2 shows a schematic representation of an embodiment of a guide apparatus that cooperates with a bike on a trainer to limit the lateral movement of the bike's rear wheel on one or more rear rollers, thereby interfering with the ability of the rear wheel to travel off of the lateral sides (in the axial direction) of the rear rollers.

The guide apparatus 22 includes a platform 24 that is shown in FIG. 1 as a metal plate on which a rearward portion of the trainer 10 rests. To guard against movement of the platform 24 on the floor, an underside of the platform 24 can optionally be provided with an anti-slip material such as a plurality of rubberized feet, a sheet of a rubberized material, and the like. A top surface of the platform 24 can optionally be provided with a plurality of standoffs 27, as shown in FIG. 2, on which portions of the frame 12 can rest when the trainer 10 is installed on the guide apparatus 22. As shown in FIG. 2, the standoffs 27 are arranged between respective hinge assemblies 30 and portions of a mounting bracket 40 to which an end of the biasing cylinder 38 is coupled, as described in detail below. Each standoff 27 can optionally include an internally-threaded passage into which a mechanical fastener such as a screw, bolt, etc. inserted through the frame 12 can be inserted to secure the frame 12 to the guide apparatus 22.

A pair of arms 26, 28 extend upwardly from the platform 24, and are spaced apart a suitable distance so as to avoid the portions of the frame 12 above the platform 24. In FIG. 1, the arms 26, 28 are separated such that each extends upwardly between lateral side members 12A, 12B of the frame 12 supporting the rollers 14, 16. However, alternate embodiments of the present guide apparatus 22 can include one or both of the arms 26, 28 extending upwardly from the platform 24 at other locations relative to the frame members 12A, 12B without departing from the scope of the present disclosure.

Shown schematically in FIG. 2, each arm 26, 28 is pivotally coupled to the platform 24 by hinge assemblies 30, allowing the arms 26, 28 to pivot about an axis established by a pivot shaft 32 in directions indicated by arrows 34. The pivot shaft 32 for each hinge assembly 30 is coupled to the platform 24 by a retainer 36, and extends through an aperture formed in the bottom region of the arms 26, 28. Accordingly, the arms 26, 28 can pivot about the pivot shaft 32 relative to the platform 24.

The pivotal orientation of each arm 26, 28 is biased by a cylinder 38 such as a pneumatic or hydraulic actuator, for example, or other biasing device that urges the arms 26, 28 toward each other at least to a substantially vertical upright orientation in which the rear wheel 4 of the bike 2 is positioned in a central region of the rear rollers 14, 16 while the bike 2 is installed on the guide apparatus 22. Each cylinder 38 extends between its respective arm 26, 28 and the platform 24. In the embodiment shown in FIG. 2, the cylinder 38 is coupled to the platform 24 by a mounting bracket 40 installed between the hinge assembly 30 and the platform.

Because of the biasing force exerted by each cylinder 38, it may be difficult to separate the arms 26, 28 while at the same time attempting to install the rear hub of the bike 2 in the couplers 44. To assist in the installation of the bike 2, a stand 98 (FIGS. 3 and 4) can resist the force exerted by at least one of the cylinders 38, provided to the arm 26 in the illustrative examples of FIGS. 3 and 4. However, the stand 98 can be provided to the other arm 28, or both arms 26, 28 without departing from the scope of the present disclosure. The stand 98 can be pivotally coupled to the platform 24 to pivot towards and away from the arm 26, but can also be locked in place on the arm 26 to maintain the arm 26 in a substantially upright orientation. In other words, the stand 98 maintains at least a minimum separation between the arms 26, 28 to allow the rear hub of the bike 2 to be received between the coupler 44 provided to each arm 26, 28 without the user further urging the arms 26, 28 away from each other. According to alternate embodiments, the stand 98 can be configured and positioned to separate the arms 26, 28 just an extent that requires the user to manually establish a short (e.g., less than one inch, or less than 0.5 inch) additional separation the rest of the way to allow the rear hub of the bike 2 to be received between the couplers 44. With the bike 2 temporarily installed between the couplers 44 and the stand 98 still in place, the rider can mount the bike 2 with the confidence afforded by the stand 98. As the rider begins to pedal, the bike 2 will lean to one side, releasing the stand 98 from the arm 26 and causing the arm 26 to fall away from the arm 26, thereby requiring the rider to balance the bike 2 between the arms 26, 28. Accordingly, the stand 98 can assist the rider in installing and mounting the bike 2.

To establish a connection between the bike 2 and the guide apparatus 22, an upper region of each arm 26, 28 is provided with a receiver 42 that cooperates with a rear hub about which the rear wheel 4 of the bike 2 rotates as shown in FIG. 1. The receiver 42 includes a coupling 44 defining a recess 45 in which an end of the rear hub is received to install the bike 2 on the guide apparatus 22. The coupling 44 is mounted on a bolt 46 or other threaded and/or adjustable member to allow adjustment of the extent to which the coupling 44 is separated from its respective arm 26, 28 and extended towards the opposing arm into the region between the arms 26, 28. Establishing the suitable distance separating the opposing couplings 44, along with the biasing force exerted by the cylinders 38 on the arms 26, 28 to urge them towards each other secures the bike 2 between the arms 26, 28 and interferes with the unintended separation of the bike 2 from the guide apparatus 22.

Figure 3:
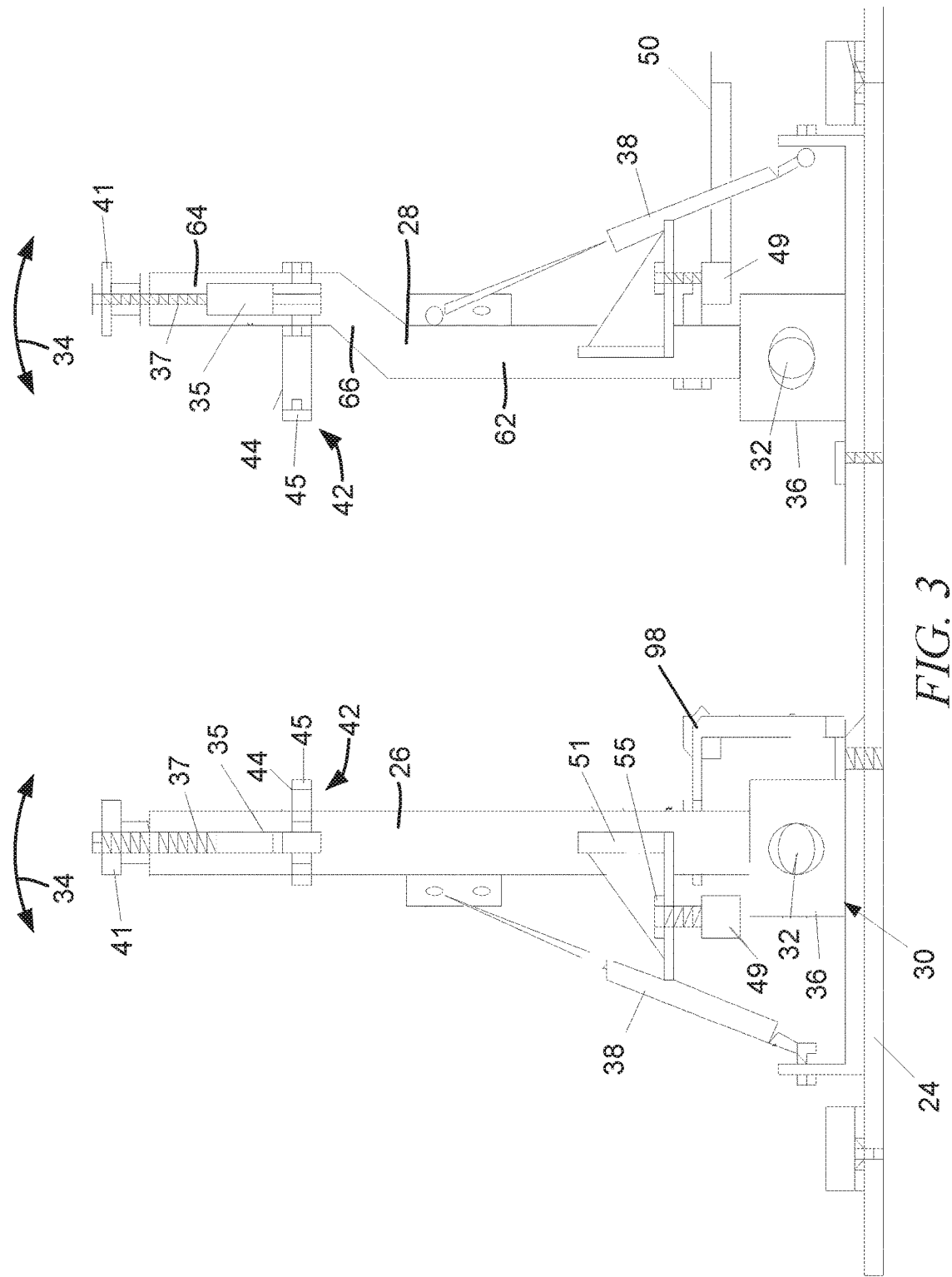
FIG. 3 shows a schematic representation of an alternate embodiment of a guide apparatus that cooperates with a bike on a trainer to limit the lateral movement of the bike's rear wheel on one or more rear rollers, thereby interfering with the ability of the rear wheel to travel off of the lateral sides (in the axial direction) of the rear rollers.

The elevation of the coupling 44 vertically above the plane of the top of the rear rollers 14,16 can optionally be made fixed, specific to a particular wheel diameter. For example, the height of the coupling 44 supported by each arm 26, 28 can be suitable to receive the hub of a 700 series bicycle wheel, which includes a tire having an outside diameter of seven hundred (700 cm.) centimeters. Thus, when the rear wheel 4 of the bike 2 rolls on the rear rollers 14, 16, the ends of the rear hub of the bike 2 are received within the recess 45 defined by each coupling 44. The fixed height of the couplings 44 allows a bike 2 with this wheel size to be supported by the guide apparatus 22 without adjustment, but is not adjustable to accommodate bikes having wheels of different sizes. However, according to alternate embodiments, the height of the couplers 44 can optionally be made adjustable. As shown in FIG. 2, each coupler 44 can be supported by a tie rod 35 that can be vertically adjusted within its respective arm 26, 28. The tie rod 35 can include a threaded segment 37 that engages a compatibly-threaded segment formed in a cap 39 provided at the top of the arms 26, 28, or formed in the top of the arms 26, 28 themselves as shown in FIG. 3. Rotating a knob 41 causes rotation of the threaded segment 37 relative to the compatibly-threaded segment provided to the cap and/or arms 26, 28, resulting in threaded adjustment of the tie rod 35 in the desired vertical direction relative to the arms 26, 28 and, hence, the elevation of the couplings 44 above the rear rollers 14, 16.

Figure 4:
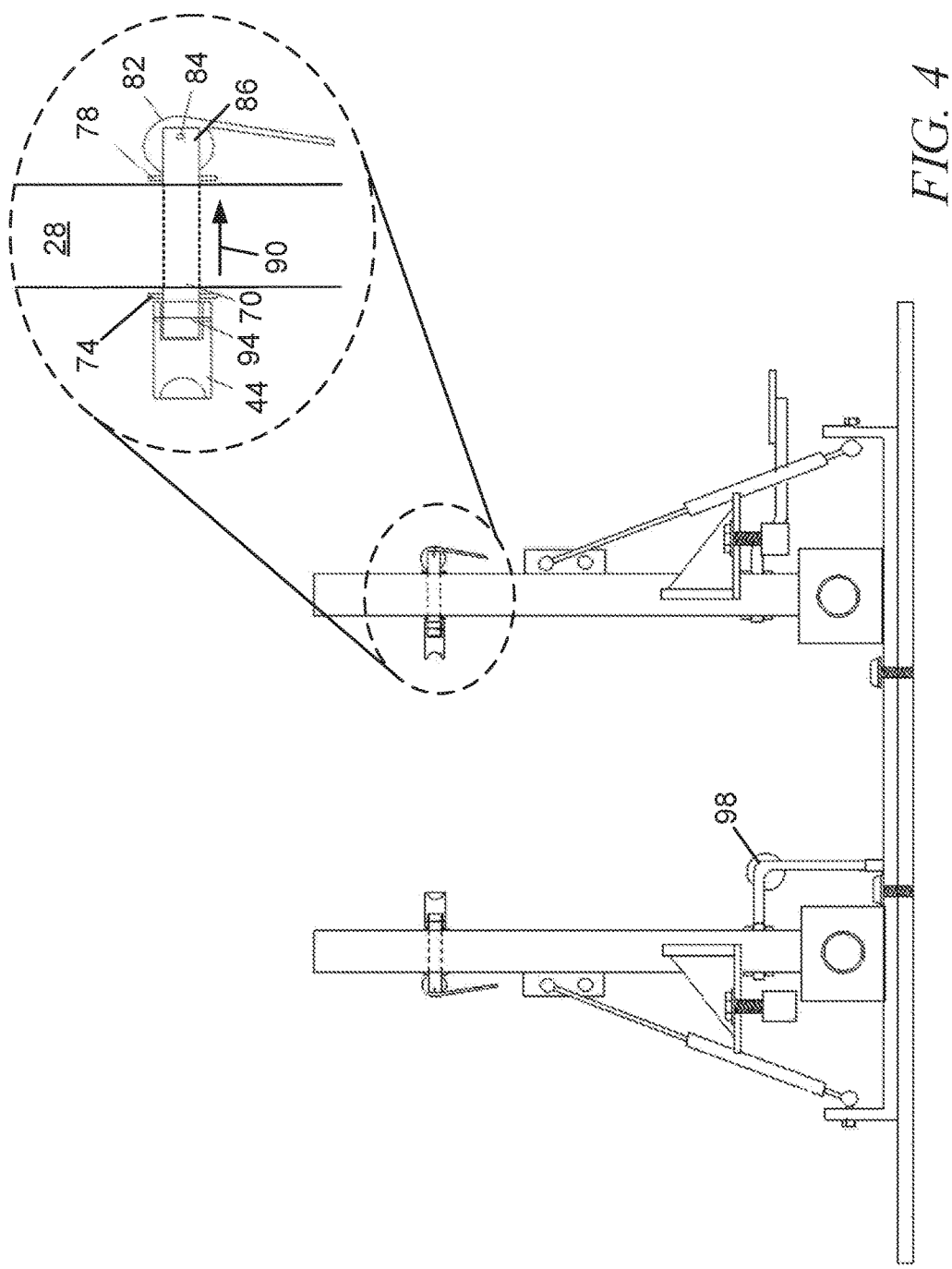
FIG. 4 shows a schematic representation, and an enlarged view of an alternative embodiment of a rear wheel coupler cam lock which, when the cam lock is released, the coupling can move up and down to accommodate various wheel and/or tire sizes.

According to an alternate embodiment shown in FIG. 4, the coupler 44 can be formed to be infinitely adjustable along a track formed in one or both of the arms 26, 28. Using the enlarged region of arm 28 in FIG. 4 as an example, the cam lock includes a metal shaft 70 (portion extending through the arm 28 shown using hidden lines), as well as a fixed washer 74 (having a fixed position along a length of the shaft 70) and a floating washer 78 (adjustable position along the length of the shaft 70) that receive the shaft 70 on opposite sides of the arm 28. The coupling 44 is attached to the shaft using a roll pin 94. An oblong cam lock 82 is pivotally coupled adjacent to an external end 86 of the shaft 70 to be pivotally adjusted about a pin 84 between a locked angular position (shown in FIG. 4) and an unlocked angular position (pivoted about 90 degrees counterclockwise from the position shown in FIG. 4). When the cam lock 82 is in the locked position, the fixed washer 74 the shape of the cam lock 82 urges the shaft 70 outward in the direction indicated generally by arrow 90, pulling the shaft 70 a short distance through the arm 28 and the floating washer 78. The arm 28 is compressed between the fixed washer 74 and the floating washer 78 with the cam lock 82 in this locked position. Adjusting the cam lock 82 to the unlocked position alleviates the compressive force exerted on the arm 28 by the washers 74, 78, thereby allowing freedom of movement of the coupling 44 forward and backward, up and down, as well as side-to-side to accommodate various wheel and/or tire sizes.

The embodiment of the guide apparatus 22 shown in FIG. 2 includes a pair of substantially-linear arms formed from square metallic tubing. However, the scope of the present application is not so limited. For example, an alternate embodiment of the guide apparatus 22 is shown in FIG. 3, and includes one arm 28 having a linear region 62 and an offset region 64, with a transition region 66 in between. The portion of the offset region 64 that is substantially parallel with the arm 26 is separated from the arm 26 by a distance greater than the distance separating the linear region 62 from the arm 26. The added separation of the offset region 64 from the arm 26 affords the guide apparatus 22 the flexibility to couple a variety of different bikes 2 with gear cassettes 7 (FIG. 1) of different sizes and/or different derailleur 8 configurations.

Regardless of the embodiment, each arm 26, 28 is also provided with a limiter 48 that contacts the respective frame member 12A, 12B to establish a limit to the pivotal adjustment of each arm 26, 28 in a laterally-outward direction (i.e., in a direction away from the opposite arm). The limiter 48 can include a spacer 49 formed from an elastically-compressible material that is compressed when the limiter is 48 pressed against the respective one of the frame members 12A, 12B as a result of pivotal movement of the arms 26, 28, and then rebound when the compressive force has been removed. The limit to the pivotal movement of each arm 26, 28 established by the limiter 48 is suitable to prevent the rear wheel 4 from exiting either lateral side of the rear rollers 14, 16. In other words, when the spacer 49 is fully compressed, further pivotal movement of the respective arm 26, 28 is prevented. The spacer 49 can optionally be removably coupled to a bracket 51 extending from each arm 26, 28 by a releasable mechanical fastener 55. For example, an externally-threaded bolt can extend through the spacer 49 and an aperture formed in the bracket 51 and an internally-threaded nut threaded onto the end of the bolt to secure the spacer 49 in place. Should the spacer 49 wear out, become damaged or otherwise need to be replaced, the nut can be removed from the bolt and then subsequently replaced to couple a new spacer 49 to that bracket.

The limiter 48 may make it difficult to separate the arms 26, 28 enough to allow installation of the bike 2 on the guide apparatus 22 once the compressible material has begun to be compressed. To help alleviate this problem, one or both arms 26, 28 can optionally be provided with a foot pedal 50 positioned to, when pressed or stepped on, cause the respective arm 26, 28 to pivot away from the other arm 26, 28 a sufficient distance to allow placement of the rear hub of the bike 2 between the opposing couplings 44. With the rear hub properly positioned between the couplings 44, the pressure exerted on the foot pedal 50 can be removed to allow the cylinder 38 of the respective arm to again urge that arm 26, 28 toward the other arm, causing the rear hub of the bike 2 to be received by each of the couplings 44.

In use, the bike 2 installed on the guide apparatus 22 can be ridden to cause rotation of the rear wheel 4 which, in turn, causes the rear rollers 14, 16 to rotate. Through operation of the drivetrain 20, rotation of the rear roller 16 also causes the front roller 18, and also the front wheel 6 of the bike 2 to rotate. Since both wheels 4, 6 are rolling on the rotating rollers 14, 16, 18, the bike 2 may travel laterally (along the axial direction of those rollers 14, 16, 18) relative to the trainer 10. As the bike 2 so travels, the arms 26, 28 pivot to travel with the bike 2 up to a travel limit permitted by the guide apparatus 22. As the bike 2 approaches the travel limit in either lateral direction, the limiter 48 becomes compressed between one of the frame members 12A, 12B, and interferes with further lateral travel of the bike 2 to an extent that would result in the rear wheel 4 of the bike 2 exiting the trainer 10 off of a side of the rollers 14, 16.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bike trainer to be coupled to a bicycle, the bike trainer comprising:
    a frame rotatably supporting a pair of rear rollers spaced a distance apart from each other along a longitudinal axis of the frame to rotatably support a rear wheel of the bicycle that rolls on both of the rear rollers;
    a front roller spaced apart from the rear rollers along the frame a suitable distance to rotatably support a front wheel of the bicycle;
    a drivetrain that couples at least one of the rear rollers to the front roller and transfers a rotational force imparted on the at least one of the rear rollers by the bicycle to the front roller to cause rotation of the front roller; and
    a guide apparatus that is separate from the frame and comprises:
        (i) a connection mechanism that is pivotally supported at an elevation vertically above the frame to cooperate with a rear hub of the bicycle and couple the bicycle to the bike trainer,
        (ii) a plurality of arms pivotally coupled to the guide apparatus to be arranged adjacent to opposite lateral sides of the frame, each arm supporting a portion of the connection mechanism that cooperates with the rear hub of the bicycle, and
        (ii) a biasing cylinder that urges at least one of the arms toward a neutral position in which the guide apparatus positions the rear wheel within a central region between the terminal lateral ends of the rear rollers, and allows lateral movement of the rear wheel in axial directions along the rear rollers during rotation of the rear wheel of the bicycle, but limits an extent of the lateral movement to maintain the rear wheel between terminal lateral ends of the rear rollers.

2. The bike trainer of claim 1, wherein the biasing cylinder comprises a pneumatic or hydraulic cylinder that extends between a base of the guide apparatus and the at least one of the arms.

3. The bike trainer of claim 1 further comprising a foot pedal coupled to at least one of the arms that, when pressed, causes pivotal movement of the at least one of the arms generally away from another one of the arms a sufficient distance to receive a rear hub of the bicycle between couplings provided to the pair of arms.

4. The bike trainer of claim 1 further comprising a limiter coupled to each of the arms, wherein each limiter comprises an elastically-compressible spacer supported to be compressed against a portion of the bike trainer as a result of pivotal movement of each arm generally away from an opposing arm.

5. The bike trainer of claim 4, wherein the elastically-compressible spacers are supported to be compressed against portions of the frame as a result of pivotal movement of the arms.

6. The bike trainer of claim 1, wherein a first arm comprises linear region and an offset region, the linear region of the first arm is separated from a second arm in the pair of arms by a first distance, and the offset region of the first arm is separated from the second arm by a second distance, the second distance being greater than the first distance separating the linear region from the second arm.

7. The bike trainer of claim 6, wherein the connection mechanism comprises a receiver that extends inward from each of the arms, toward a region between the arms, defining recesses in which terminal ends of the rear hub are received, wherein a first receiver supported adjacent to the offset region extends a greater distance from the arm than a second receiver provided to the opposing arm.

8. The bike trainer of claim 1, wherein the drivetrain comprises a length of material that extends about the front roller and at least one of the rear rollers in a continuous loop, and is received within a first groove formed in the at least one of the rear rollers and a second groove formed in the front roller.

9. The bike trainer of claim 1, wherein the frame is articulated.

10. The bike trainer of claim 1, wherein the rear rollers are rotatable independently of each other.

* * * * *